C. O. BARNES.
STEERING GEAR FOR MOTOR VEHICLES.
APPLICATION FILED JAN. 11, 1908.
903,349.
Patented Nov. 10, 1908.
3 SHEETS—SHEET 2.
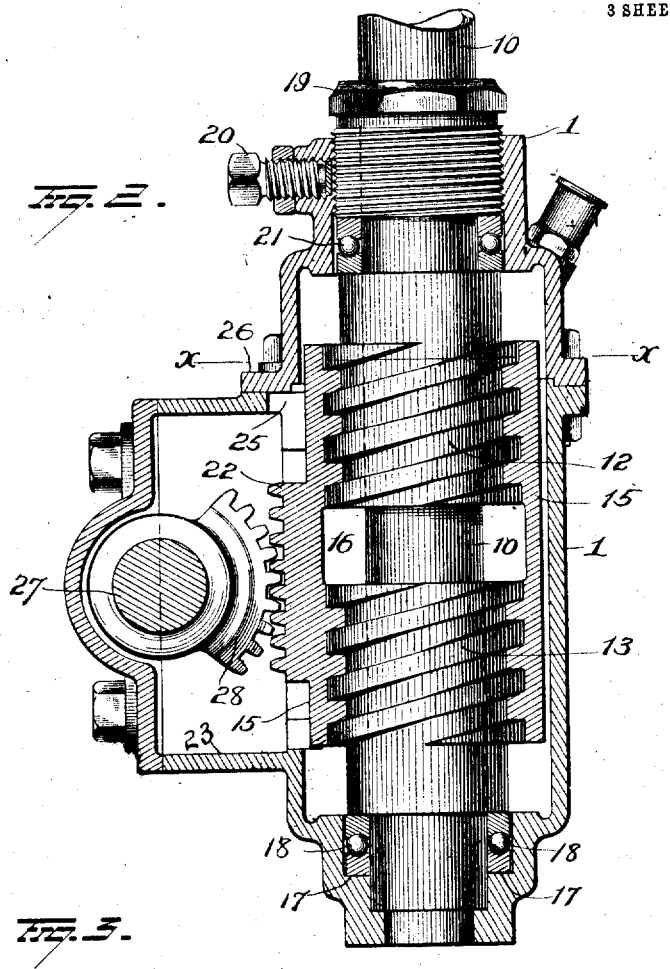
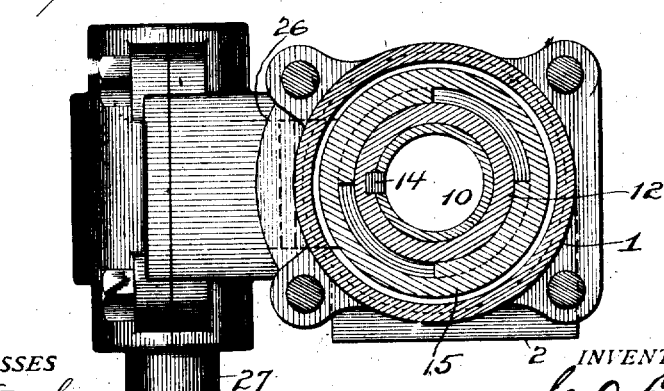
WITNESSES
E. J. Nottingham
G. F. Downing
INVENTOR
C. O. Barnes
By H. A. Seymour
Attorney C. O. BARNES.
STEERING GEAR FOR MOTOR VEHICLES.
APPLICATION FILED JAN. 11, 1908.
903,349.
Patented Nov. 10, 1908.
3 SHEETS—SHEET 3.
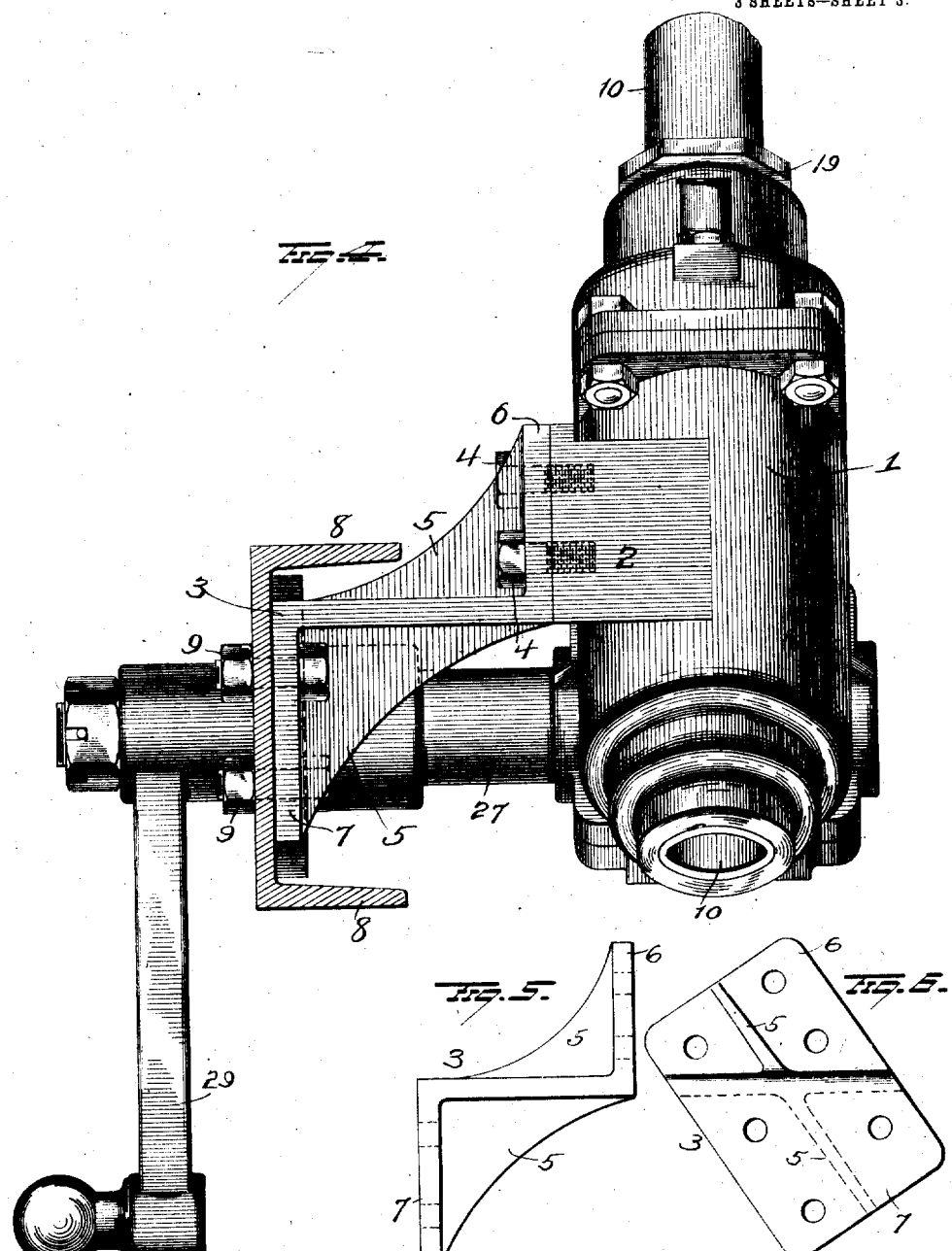

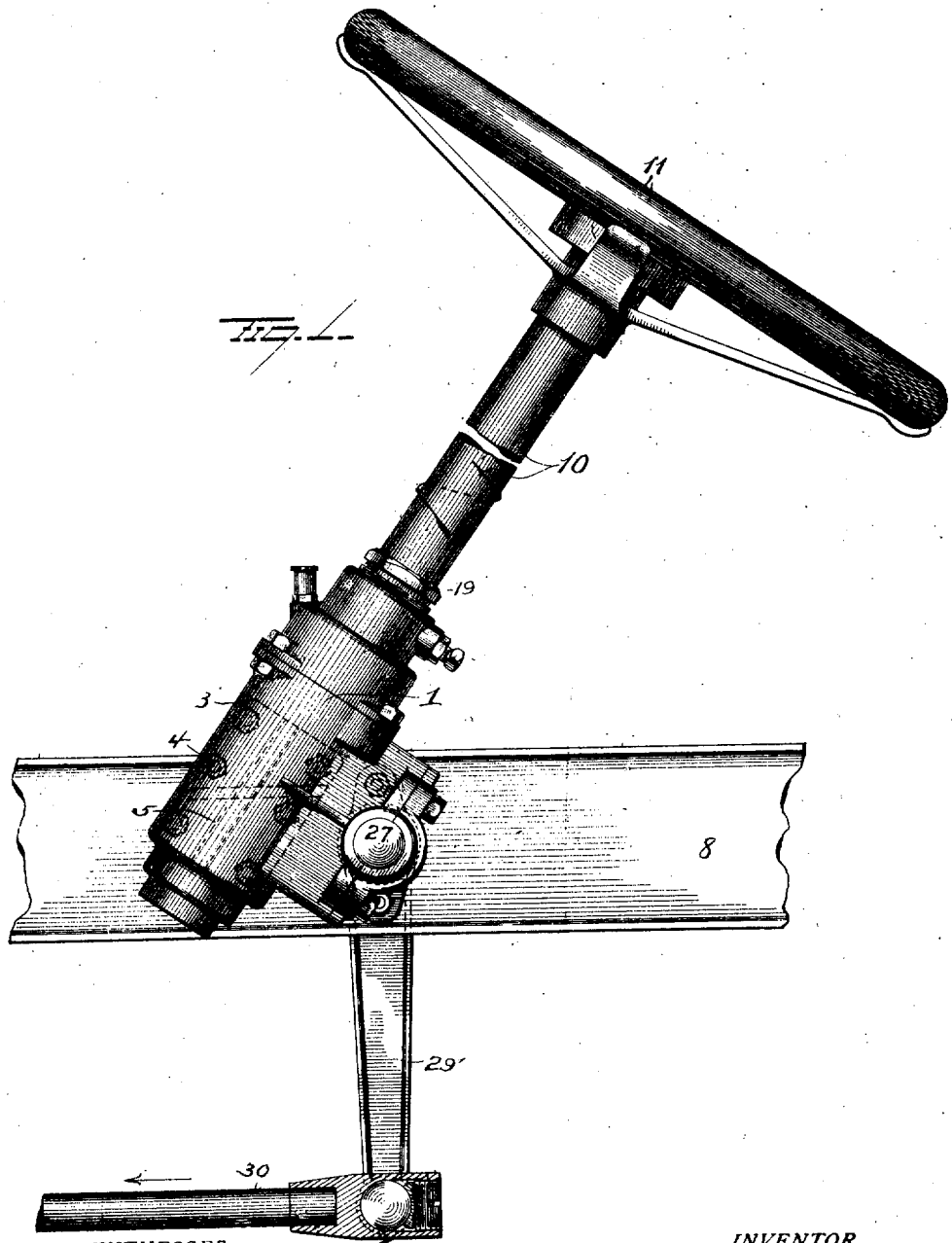

UNITED STATES PATENT OFFICE.

CHARLES O. BARNES, OF OSWEGO, NEW YORK.

STEERING-GEAR FOR MOTOR-VEHICLES.

No. 903,349.  Specification of Letters Patent.  Patented Nov. 10, 1908.

Application filed January 11, 1908. Serial No. 410,379.

*To all whom it may concern:*

Be it known that I, CHARLES O. BARNES, of Oswego, in the county of Oswego and State of New York, have invented certain new and useful Improvements in Steering-Gear for Motor-Vehicles; and I do hereby declare the following to be a full, clear, and exact description of the invention, such as will enable others skilled in the art to which it appertains to make and use the same.

My invention relates to steering gear for motor vehicles,—the object of the invention being to so construct steering mechanism of the character described, that the number of parts shall be reduced to a minimum; so that a costly amount of machining shall be avoided, and so that steering gear of a standard pattern can be applied to any machine, regardless of the particular style or configuration of the frame-work of the latter.

With this object in view the invention consists in certain combinations and arrangements of parts and details of construction as hereinafter set forth and pointed out in the claims.

In the accompanying drawings, Figure 1 is an elevation of steering mechanism embodying my improvements. Fig. 2 is a longitudinal sectional view, partly in elevation and with some parts removed. Fig. 3 is a transverse sectional view on the line x—x of Fig. 2. Fig. 4 is a view in elevation illustrating the manner of securing the mechanism to the frame of a vehicle, a portion of the latter being shown in section, and Figs. 5 and 6 are detailed views of a bracket by means of which the mechanism is anchored to the frame of a vehicle.

1 represents a housing in which the mechanism hereinafter described is inclosed, and this housing is provided with an enlargement 2 against the face of which a bracket 3 is removably secured by means of bolts 4. This bracket may be of any desired shape to accommodate it to the framework of the vehicle to which the steering mechanism is to be applied, but in the drawings I have illustrated a bracket having a general Z-shape with strengthening webs 5,—the member 6 of the bracket being removably secured to the enlargement 2 of the housing as above stated, and the member 7 of said bracket being removably secured to the framework 8 of the vehicle by means of suitable bolts 9.
By the provision of a removable bracket, I am enabled to make all housings of the same general pattern and apply them to vehicles having different constructions of framework.

A mast 10, provided at its upper end with a steering wheel 11, passes through the housing 1 and bearings are provided in proximity to both ends of said housing for said mast. Located within the housing 1 are two worms 12, 13, the lower worm 13 being rigidly secured in any suitable manner to the mast 10 and the upper worm 12 being connected with the mast by means of a suitable key 14 so as to permit the worms 12—13 to be adjusted for wear between the threads of said worms and the threads of an internally threaded sleeve 15 inclosed within the housing 1. The worms 12 and 13 are spaced apart and there is also a blank space 16 between the upper and lower internal threads of the sleeve 15. The sleeve 15 is capable of longitudinal movement within the housing and it is of an appreciable less diameter than the internal diameter of the housing, so that machining of the interior face of the latter and the exterior face of the sleeve 15 can be avoided as these faces do not make contact with each other.

The lower end of the housing is provided with a shoulder 17 and between this shoulder and the lower end of the worm 13, ball-bearings 18 are located. An externally threaded sleeve 19 embraces the mast 10 and is screwed into the upper end of the housing 1, where it is retained at any desired adjustment by means of one or more screws 20 passed through the wall of the housing. Between the lower end of the threaded sleeve 19 and the upper worm 12 ball-bearings 21 are located.

The sleeve 15 is provided exteriorly with an integral rack 22 which projects into an enlarged portion 23 of the housing and is guided by the latter in a manner to permit the free longitudinal movements of the sleeve 15 but prevent rotation of the latter. In order to facilitate the insertion of the sleeve 15 with its rack 22 into the housing, the latter is provided with an opening 25 which is normally covered by a lip or flange 26 projecting from the upper cap-portion of the housing.

A shaft 27 is mounted in suitable bearings in the enlarged portion 23 of the housing and to this shaft a toothed-segment 28 is suitably secured and receives motion from the rack 22. At a point beyond the bearings of the shaft 27, an arm 29 is secured to the latter and to the free end of this arm a rod 30 is pivotally connected,—the other end of this rod being attached in any suitable manner to the journals of the steering wheels of the vehicle.

From the construction and arrangement of parts above described, it will be seen that when the mast 10 is turned motion will be transmitted through the worms 12—13 to the sleeve 15 and the longitudinal movement of the latter thus caused, will be transmitted through the rack 22 and segment 28 to the shaft 27, and from the latter, through the arm 29 and rod 30 to the steering wheels.

Having fully described my invention what I claim as new and desire to secure by Letters-Patent, is,—

1. In a steering gear for vehicles, the combination with a housing and a mast having bearings therein, of two worms spaced apart on said mast one of said worms being adjustable, a single sleeve having internally threaded portions spaced apart and meshing respectively with the worms, a shaft adapted to be connected with the steering wheels of a vehicle, and means for transmitting motion from said sleeve to said shaft.

2. In a steering gear for vehicles, the combination with a housing and a mast having bearings therein, of two worms, one of which is rigidly secured and the other adjustably secured to the mast within the housing, a sleeve having internally threaded portions spaced apart and meshing respectively with the worms, said sleeve movable longitudinally within the housing, a shaft mounted in the housing and adapted to be connected with the steering wheels of a vehicle, and means for connecting the longitudinally movable sleeve and said shaft for operating the latter.

3. In a steering gear for vehicles, the combination with a housing and a mast having bearings in proximity to the ends of said housing, of a single sleeve located within said housing out of contact with the interior wall thereof and having internal threaded portions separate from each other, said sleeve being longitudinally movable within the housing and provided centrally between its ends with a blank portion, two worms secured to the mast above and below the blank portion within the sleeve and meshing with the respective internal threaded portions of the latter one of said worms being adjustable, a shaft mounted in the housing and adapted to be connected with the steering wheels of a vehicle, a toothed segment secured to said shaft, and a rack on the longitudinally movable sleeve meshing with said toothed segment.

4. In a steering gear for vehicles, the combination with a mast, of two worms thereon, one of said worms being fixed to the mast and the other adjustable thereon, a single sleeve having internal threaded portions meshing with the respective worms and means for transmitting motion of said sleeve to the steering wheels of the vehicle.

5. In a steering gear for vehicles, the combination with a housing and a mast having bearings therein, of two worms spaced apart on said mast one of said worms being adjustable, a single sleeve having internally threaded portions spaced apart and meshing respectively with the worms, means for preventing rotation of said sleeve, a shaft adapted to be connected with the steering wheels of a vehicle, and means for transmitting motion from said sleeve to said shaft.

In testimony whereof, I have signed this specification in the presence of two subscribing witnesses.

CHARLES O. BARNES.

Witnesses:
L. F. FULLER,
H. I. THRALL.